No. 673,491. Patented May 7, 1901.
J. BARDIN.
APPARATUS FOR DISINFECTING, DEODORIZING, AND FUMIGATING.
(Application filed Oct. 25, 1900.)
(No Model.)
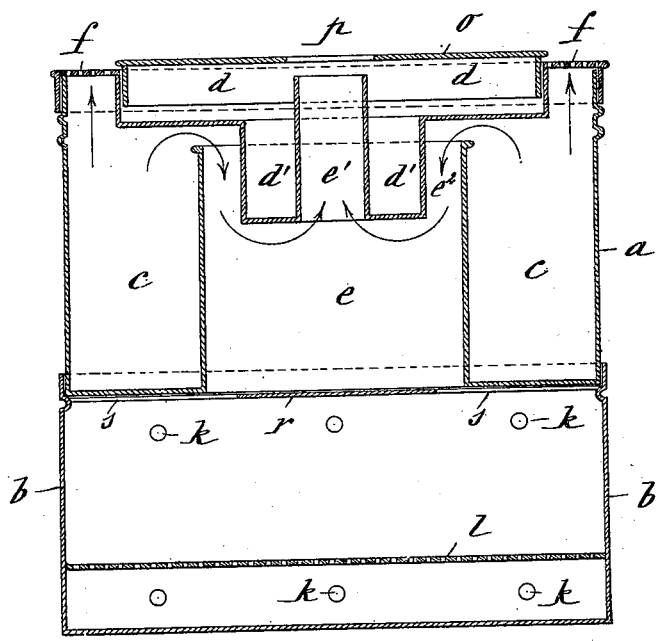
WITNESSES:
Ella L. Giles
Otto Munk
INVENTOR
Jean Bardin
BY
Richards Co
ATTORNEYS

UNITED STATES PATENT OFFICE.

JEAN BARDIN, OF BRUSSELS, BELGIUM.

APPARATUS FOR DISINFECTING, DEODORIZING, OR FUMIGATING.

SPECIFICATION forming part of Letters Patent No. 673,491, dated May 7, 1901.

Application filed October 25, 1900. Serial No. 34,265. (No model.)

*To all whom it may concern:*

Be it known that I, JEAN BARDIN, a subject of the King of Belgium, and a resident of Brussels, Belgium, have invented certain new and useful Improvements in Apparatus for Disinfecting, Deodorizing, Fumigating, and the Like, of which the following is a specification.

This invention relates to apparatus for disinfecting, deodorizing, fumigating, and similar purposes in which vapors of formol, eucalyptol, or other products possessing disinfecting, deodorizing, or other properties are produced simultaneously with water-vapor by means of a heating device or heater, in combination with a slowly-consuming combustible substance burning without producing a flame, such as amadon, nitrated carbon, &c. This class of apparatus as hitherto constructed generally gives rise to great inconveniences resulting from the great amount of heat produced by the combustible substances hereinbefore mentioned, the disinfecting substance to be evaporated being subjected only unequally to the action of heat, which is too intense at the places where the substance is directly exposed to the action of the combustible and too weak at the upper part of the apparatus, in such a manner that the vaporization of the disinfecting substance takes place very irregularly and generally in a most unfavorable manner.

The object of the present invention is to provide for a regular and uniform vaporization of the disinfecting substance; and my invention chiefly consists in a special form and construction of the part of the apparatus which is designed to contain the disinfecting substance, this construction being such that the disinfecting substance intended to be evaporated is not exposed directly to the heat of the combustible substance, but is subjected to the heat of water-vapor, which, circulating around the walls of the receptacle containing the disinfecting substance, maintains the said receptacle at a constant and uniform degree of heat, which allows of a uniform and regular transformation of the disinfecting substance into vapors.

Referring to the annexed drawing, which shows a vertical section of an apparatus constructed according to my invention, $b$ is the part of the apparatus or receptacle designed to contain the slowly-consuming combustible substance, such as nitrated carbon or amadon, placed on a perforated sheet $l$, the said receptacle being provided with air-inlet openings $k$ and supporting the upper parts of the apparatus.

$a$ is a vat fitted with a tubular part $e$, so as to form an annular receptacle $c$, designed to contain the water intended to be evaporated simultaneously with the disinfecting substance. This vat $a$ is closed at its upper part by a perforated lid $f$, forming part of the wall of another receptacle $d$, containing the disinfecting substance which is to be evaporated. This receptacle $d$ is large and flat and provided at its center with a part $d'$, projecting downwardly to some extent in the duct formed by the tubular projection $e$. The said receptacle $d$ is further provided with a central tube $e'$, opening in the tubular projection $e$ and under the aperture $p$ of a lid $o$, covering the receptacle $d$.

The construction of the receptacle $d$ is such, as shown on the drawing, as to leave a free space $e^2$ between the bottom of the said receptacle and the upper part of the tubular projection $e$ and between the lateral wall of the said projection $e$ and of the part $d'$ projecting downwardly in this tubular projection.

The upper part of the receptacle $b$ may be provided under the tubular part $e$ of vat $a$ with a plate $r$, supported by arms $s$ and adapted to cause the heat generated in the receptacle $b$ to be deflected laterally, so as to act more directly on the lower part of the vat $a$.

The apparatus thus constructed acts in the following manner: The combustible substance burning on the perforated sheet $l$, and the combustion of which is favored by air entering the receptacle $b$ by the inlet-openings $k$, heats the water contained in the annular receptacle $c$ and also, but still more indirectly, the lower part $d'$ of the receptacle $d$, containing the disinfecting substance. The water contained in the annular receptacle $c$ is rapidly brought to ebullition. A part of the water-vapor thus generated escapes through the apertures of the perforated lid $f$, while the other part, circulating around the wall of the receptacle, escapes through the space $e^2$ in the duct $e$ and therefrom into the central tube $e'$, together with the products of combustion coming from the lower receptacle $b$, through the duct $e$ after having passed around the deflecting-plate $r$ when such a plate is used. This vapor escapes finally through the opening $p$ of the cover $o$ simultaneously with the vapors of the disinfecting substance. In consequence of the above arrangements as soon as the apparatus is started the receptacle $d$, containing the disinfecting substance, is surrounded on all sides by water-vapor, this vapor having a nearly constant temperature, and the receptacle being relatively distant from the place where heat is generated the temperature to which the disinfecting substance is exposed cannot rise so as to injure the disinfecting substance, and vaporization takes place very regularly and economically, the vapors of the disinfecting substance being always mixed in the same proportions with water-vapor, a result of the most importance with regard to the success of the disinfecting operation.

Having now particularly described and ascertained the nature of my said invention and in what manner the same is to be performed, I declare that what I claim is—

1. An apparatus for disinfecting and the like purposes comprising a heating-chamber for containing a combustible substance, a water-receptacle surmounting said heater a cover for said water-chamber having an outer perforated portion and an inner depressed portion forming a receptacle for the disinfecting substance, said inner portion having a steam-passage, substantially as described.

2. In combination the heater-chamber, the water-receptacle mounted thereon, having an annular water-chamber and an open center, a cover for said water-receptacle having a depressed inner portion provided with a tubular part, said depressed portion depending into the open center of the water-receptacle and a cover for said depressed portion, having an opening in line with the tubular part or chimney, substantially as described.

In witness whereof I have hereunto set my hand in presence of two witnesses.

JEAN BARDIN.

Witnesses:
 GEORGE BEDE,
 GREGORY PHELAN.